(12) United States Patent
Cho

(10) Patent No.: US 11,220,233 B2
(45) Date of Patent: Jan. 11, 2022

(54) SIDE AIRBAG APPARATUS AND MANUFACTURING METHOD THEREOF

(71) Applicant: HYUNDAI MOBIS CO., LTD., Seoul (KR)

(72) Inventor: Kwang Soo Cho, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 16/891,786

(22) Filed: Jun. 3, 2020

(65) Prior Publication Data

US 2020/0384942 A1 Dec. 10, 2020

(30) Foreign Application Priority Data

Jun. 4, 2019 (KR) .................. 10-2019-0065889

(51) Int. Cl.
*B60R 21/239* (2006.01)
*B60R 21/233* (2006.01)
(Continued)

(52) U.S. Cl.
CPC .......... *B60R 21/235* (2013.01); *B60R 21/233* (2013.01); *B60R 21/237* (2013.01); *B60R 21/239* (2013.01); *B60R 21/2338* (2013.01); *B60R 21/23138* (2013.01); *B60R 21/207* (2013.01); *B60R 2021/23146* (2013.01); *B60R 2021/23324* (2013.01); *B60R 2021/23382* (2013.01); *B60R 2021/23538* (2013.01); *B60R 2021/23576* (2013.01); *B60R 2021/23595* (2013.01)

(58) Field of Classification Search
CPC B60R 2021/23146; B60R 2021/23138; B60R 2021/23538; B60R 2021/23576; B60R 2021/23595; B60R 2021/23533; B60R 2021/23324; B60R 2021/23382; B60R 2021/0006; B60R 2021/23316; B60R 21/235; B60R 21/237; B60R 21/239; B60R 21/233; B60R 21/207; B60R 21/2346; B60R 21/2338; B60R 21/23138
USPC .................................. 280/730.2, 729, 743.2
See application file for complete search history.

(56) References Cited

U.S. PATENT DOCUMENTS

| 8,757,657 B1* | 6/2014 | Hotta | B60R 21/263 |
| | | | 280/730.2 |
| 2013/0033022 A1* | 2/2013 | Yamamoto | B60R 21/233 |
| | | | 280/730.2 |

(Continued)

*Primary Examiner* — Keith J Frisby
(74) *Attorney, Agent, or Firm* — H.C. Park & Associates, PLC

(57) ABSTRACT

A side airbag apparatus including a cushion sheet part having a first insertion slot part and first stud hole parts; a pocket sheet part having a second insertion slot part and second stud hole parts to correspond to the first insertion slot part and the first stud hole parts, respectively, and superposed on the cushion sheet part; partition sheet parts superposed on the cushion sheet part so as to be connected to both sides of the pocket sheet part; first sewing parts that connect the partition sheet parts and the pocket sheet part to the cushion sheet part; a second sewing part that connects superposed ends of the pocket sheet part and partition sheet parts that are folded in half; and a third sewing part that connects superposed circumferential portions of the cushion sheet part after the cushion sheet part is folded on the basis of a center portion thereof.

20 Claims, 9 Drawing Sheets

(51) Int. Cl.
*B60R 21/2338* (2011.01)
*B60R 21/235* (2006.01)
*B60R 21/231* (2011.01)
*B60R 21/237* (2006.01)
*B60R 21/207* (2006.01)

(56) References Cited

U.S. PATENT DOCUMENTS

2017/0008481 A1* 1/2017 Hotta ................ B60R 21/23138
2017/0028962 A1* 2/2017 Goto ..................... B60R 21/207
2017/0240133 A1* 8/2017 Shibata ................ B60R 21/237
2017/0369020 A1* 12/2017 Hiraiwa .................. B60N 2/99

* cited by examiner

SIDE AIRBAG APPARATUS AND MANUFACTURING METHOD THEREOF

CROSS-REFERENCE TO RELATED APPLICATION

This application claims priority from and the benefit of Korean Patent Application No. 10-2019-0065889, filed on Jun. 4, 2019, which is hereby incorporated by reference for all purposes as if set forth herein.

BACKGROUND

Field

Exemplary embodiments of the present disclosure relate to a side airbag apparatus and a manufacturing method thereof, and more particularly, to a side airbag apparatus capable of simplifying manufacturing processes and reducing manufacturing costs, and a manufacturing method thereof.

Discussion of the Background

In general, airbags are installed at various positions in a vehicle. Side airbags are installed on one side of a seat to protect a door side of an occupant.

The side airbags serve to partition an internal space of a cushion part to produce a pressure difference between cushion regions according to a collision characteristic of the vehicle. The side airbags are manufactured by sewing two partition sheets on two main sheets. An edge sewing part is sewn to circumferential portions of the two main sheets except a portion where an inflator is inserted and a portion where a vent hole part is formed.

So far, after the inflator is inserted into the portion where the inflator is inserted, a stud part of the inflator is fitted into a stud hole part of the portion. After the portion is folded, the sewing part is sewn again to prevent leakage of a gas. Therefore, since the number of manufacturing processes and a manufacturing time of the side airbag are increased, productivity of the side airbag may be degraded. Further, since a size of the side airbag is increased in proportion to the portion where the side airbag is inserted, manufacturing costs of the side airbag may be increased.

The above information disclosed in this Background section is only for enhancement of understanding of the background of the invention and, therefore, it may contain information that does not constitute prior art.

SUMMARY

Exemplary embodiments of the present invention were made to improve the above problems, and are directed to providing a side airbag apparatus capable of simplifying manufacturing processes and reducing manufacturing costs, and a manufacturing method thereof.

In an embodiment, a side airbag apparatus includes: a cushion sheet part in which a first insertion slot part and first stud hole parts are formed; a pocket sheet part in which a second insertion slot part and second stud hole parts are formed to correspond to the first insertion slot part and the first stud hole parts, respectively, and which is superposed on the cushion sheet part; partition sheet parts superposed on the cushion sheet part so as to be connected to both sides of the pocket sheet part; first sewing parts configured to connect the partition sheet parts and the pocket sheet part to the cushion sheet part; a second sewing part configured to connect superposed ends of the pocket sheet part and the partition sheet parts in a state in which the pocket sheet part and the partition sheet parts are folded in half; and a third sewing part configured to connect superposed circumferential portions of the cushion sheet part in a state in which the cushion sheet part is folded on the basis of a center portion thereof.

In an embodiment, the cushion sheet part may be formed such that both sides thereof are symmetric with respect to the center portion thereof.

In an embodiment, the pocket sheet part may be formed such that both sides thereof are symmetric with respect to the center portion of the cushion sheet part.

In an embodiment, the partition sheet parts may be disposed on both the sides of the cushion sheet part to be symmetric with respect to the center portion of the cushion sheet part. In an embodiment, the first stud hole parts and the second stud hole parts may be formed on one side on the basis of the center portion of the cushion sheet part.

In an embodiment, the third sewing part may be sewn to a portion, except a part of a circumferential portion of the cushion sheet part, so as to form a vent hole part in the circumferential portion of the cushion sheet part.

In an embodiment, stud parts of an inflator may pass through the first stud hole parts and the second stud hole parts, and the side airbag apparatus may further include a sealing cover part into which the stud parts are fitted to seal the first stud hole parts, and a sealing sewing part configured to connect the sealing cover part to the cushion sheet part.

In an embodiment, a manufacturing method of a side airbag apparatus includes: forming a first insertion slot part and first stud hole parts in a cushion sheet part, and forming a second insertion slot part and the second stud hole parts in a pocket sheet part to correspond to the first insertion slot part and the first stud hole parts, respectively; superposing the pocket sheet part on the cushion sheet part; disposing partition sheet parts on both sides of the pocket sheet part; connecting the pocket sheet part and the partition sheet parts to the cushion sheet part using first sewing parts; superposing the pocket sheet part and the partition sheet parts, and connecting superposed ends of the pocket sheet part and the partition sheet parts using a second sewing part; and folding the cushion sheet part on the basis of a center portion thereof, and connecting superposed circumferential portions of the cushion sheet part using a third sewing part.

In an embodiment, the cushion sheet part may be formed such that both sides thereof are symmetric with respect to the center portion thereof.

In an embodiment, the pocket sheet part may be formed such that both sides thereof are symmetric with respect to the center portion of the cushion sheet part.

In an embodiment, the partition sheet parts may be disposed on both the sides of the cushion sheet part to be symmetric with respect to the center portion of the cushion sheet part.

In an embodiment, the first stud hole parts and the second stud hole parts may be formed on one side on the basis of the center portion of the cushion sheet part.

In an embodiment, the third sewing part may be sewn to a portion, except a part of a circumferential portion of the cushion sheet part, so as to form a vent hole part in the circumferential portion of the cushion sheet part.

In an embodiment, the manufacturing method may further include: inserting an inflator into the cushion sheet part through the first insertion slot part and the second insertion slot part; and inserting stud parts of the inflator into the first stud hole parts and the second stud hole parts.

In an embodiment, the manufacturing method may further include: fitting the stud parts into a sealing cover part so as to seal the first stud hole parts; and connecting the sealing cover part to the cushion sheet part using a sealing sewing part.

According to the present disclosure, if the inflator is inserted into the cushion sheet part and the pocket sheet part through the first insertion slot part and the second insertion slot part, a circumferential portion of the inflator is nearly blocked by the cushion sheet part. Thus, since the inflator is not separated from the cushion sheet part, an additional sewing process can be omitted.

Further, according to the present disclosure, since the cushion sheet part is folded and then the inflator is inserted into the first insertion slot part and the second insertion slot part, a portion in which the inflator is installed need not be sewn at the cushion sheet part in order to prevent separation of the inflator and leakage of a gas. Thus, the number of sewing processes is reduced, and an additional sewing portion is omitted, so that a size of the cushion sheet part can be reduced.

Further, according to the present disclosure, since the vent hole part is formed in a main chamber part of the cushion sheet part and is not formed in a sub-chamber part thereof, an internal pressure of the main chamber part becomes lower than that of the sub-chamber part. Thus, after absorbing an impact of an occupant in the event of a collision of a vehicle, the main chamber part can be prevented from continuously pressing the occupant, thereby reducing a possibility of injuring the occupant. It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
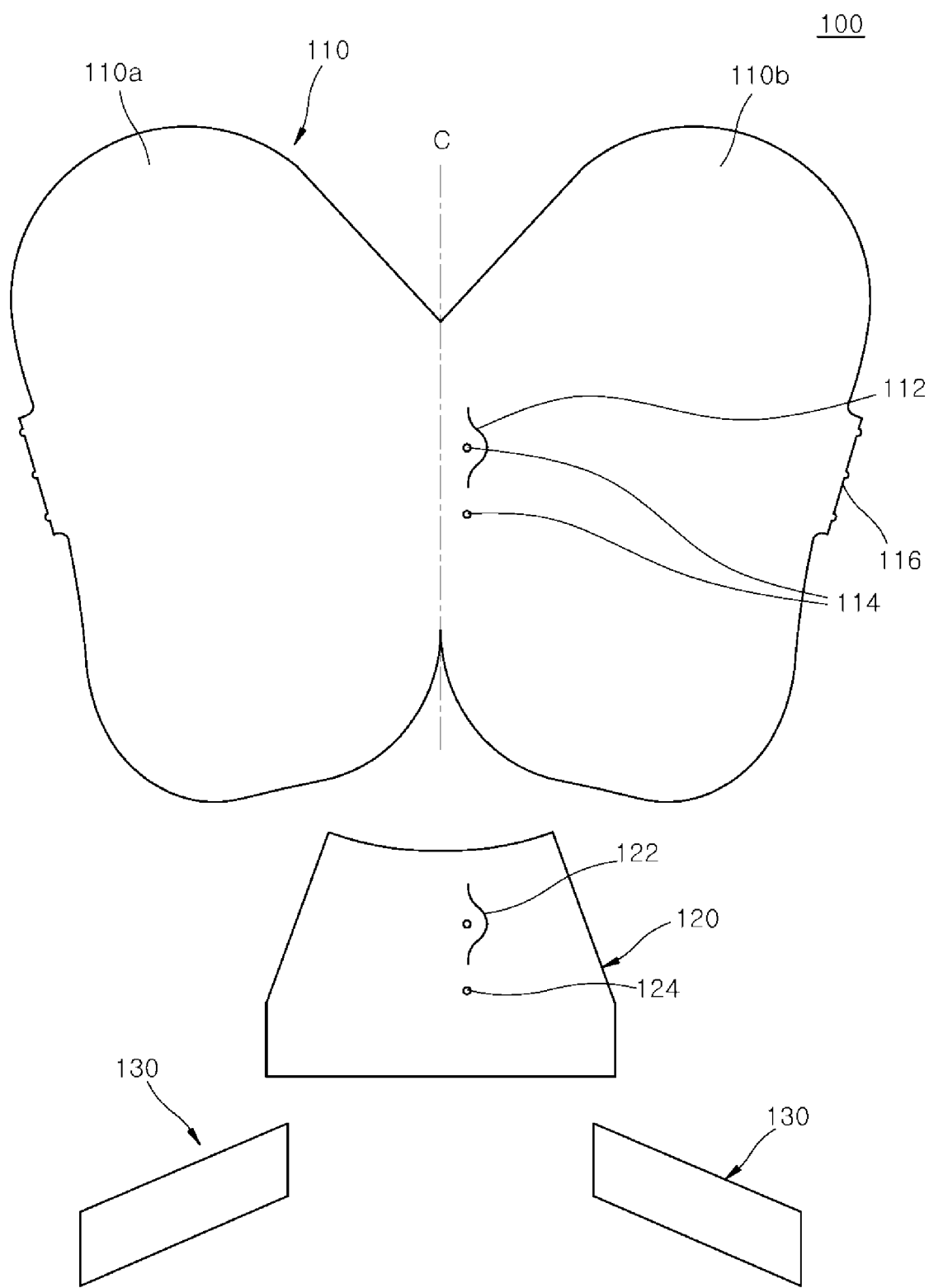
FIG. 1 is an exploded view illustrating a side airbag apparatus according to an embodiment of the present disclosure.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Hereinafter, embodiments of a side airbag apparatus and a manufacturing method thereof according to the present disclosure will be described with reference to the accompanying drawings. Thicknesses of lines or sizes of components illustrated in the drawings in the process of describing the side airbag apparatus and the manufacturing method thereof may be exaggeratedly illustrated for clarity and convenience of description. Further, terms, as will be described below, are terms defined in consideration of their functions in the present disclosure, which may be varied according to the intention of a user or an operator or practice. Therefore, the terms should be defined based on the whole contents of this specification.

Figure 2:
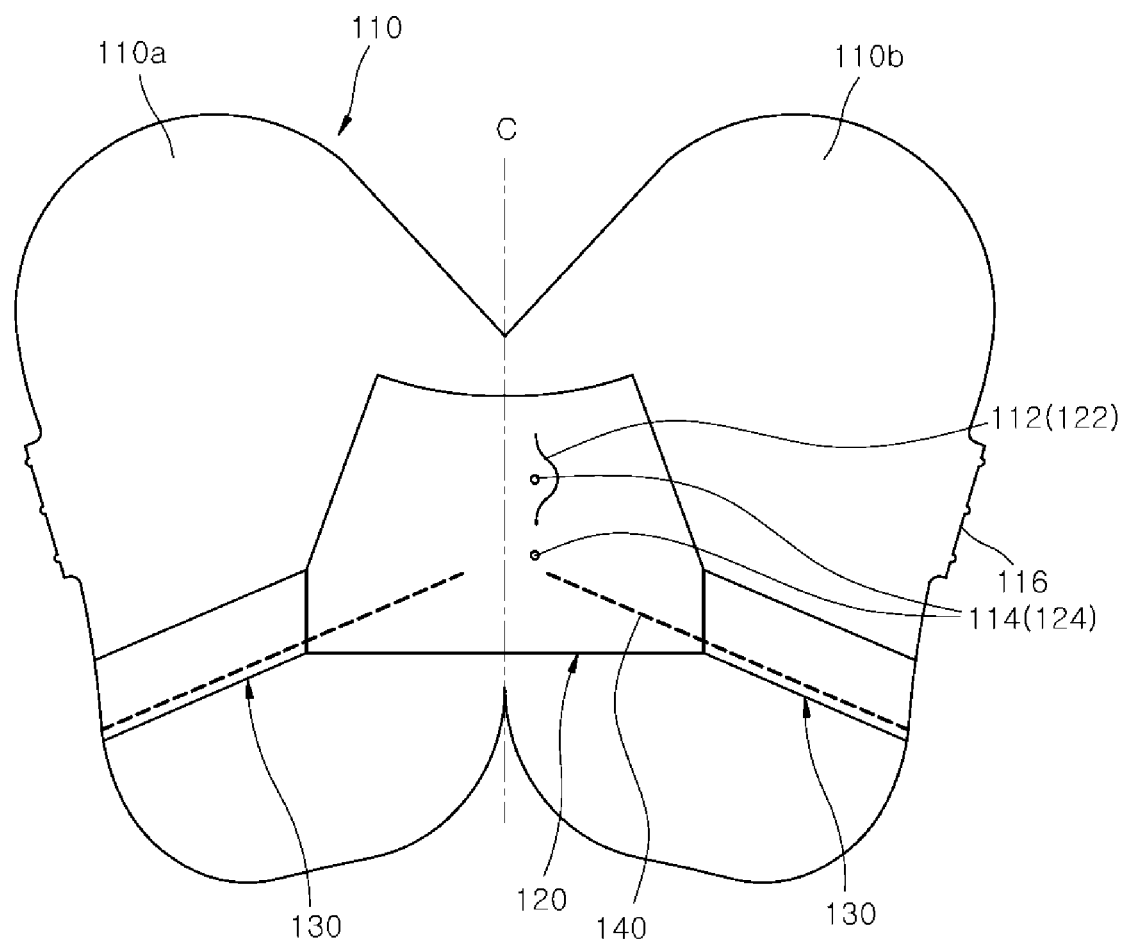
FIG. 2 is a top view illustrating a state in which first sewing parts are formed with a pocket sheet part and partition sheet parts superposed on a cushion sheet part in the side airbag apparatus according to the embodiment of the present disclosure.
Figure 3:
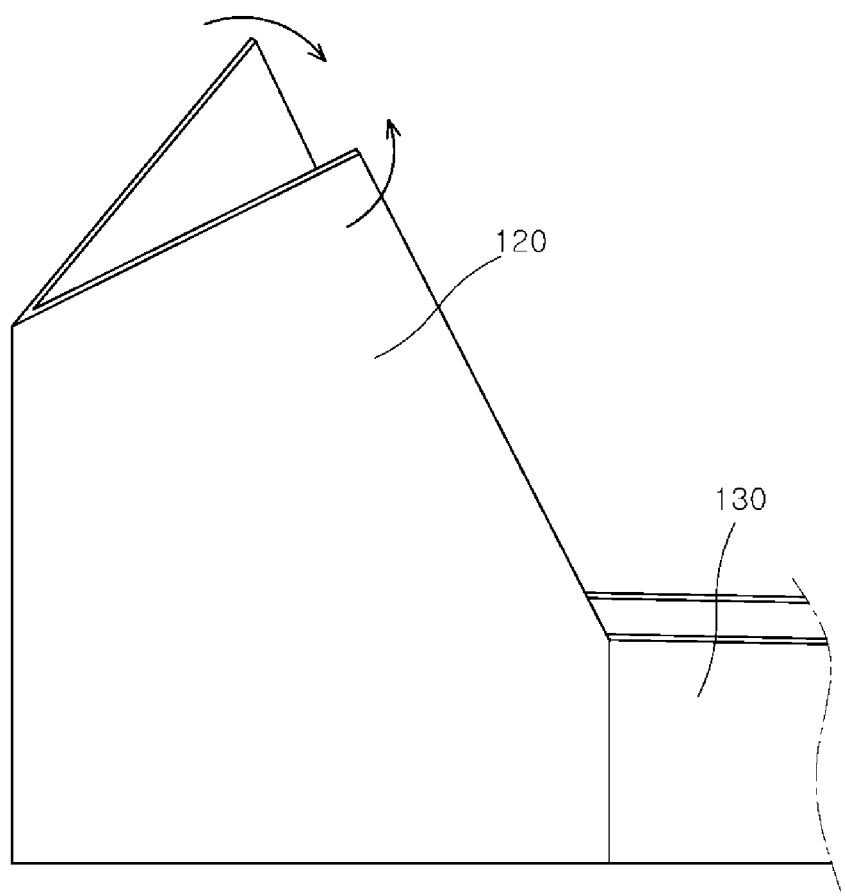
FIG. 3 is a perspective view illustrating a state in which the pocket sheet part and the partition sheet parts are superposed in the side airbag apparatus according to the embodiment of the present disclosure.
Figure 4:
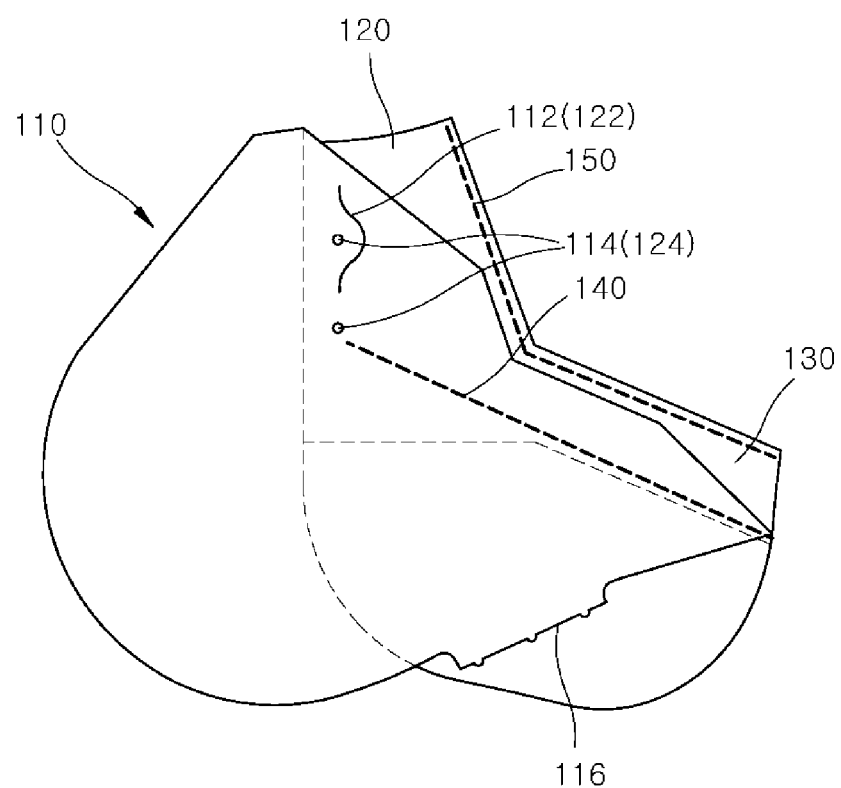
FIG. 4 is a perspective view illustrating a state in which a second sewing part is formed after the pocket sheet part and the partition sheet parts are superposed in the side airbag apparatus according to the embodiment of the present disclosure.
Figure 5:
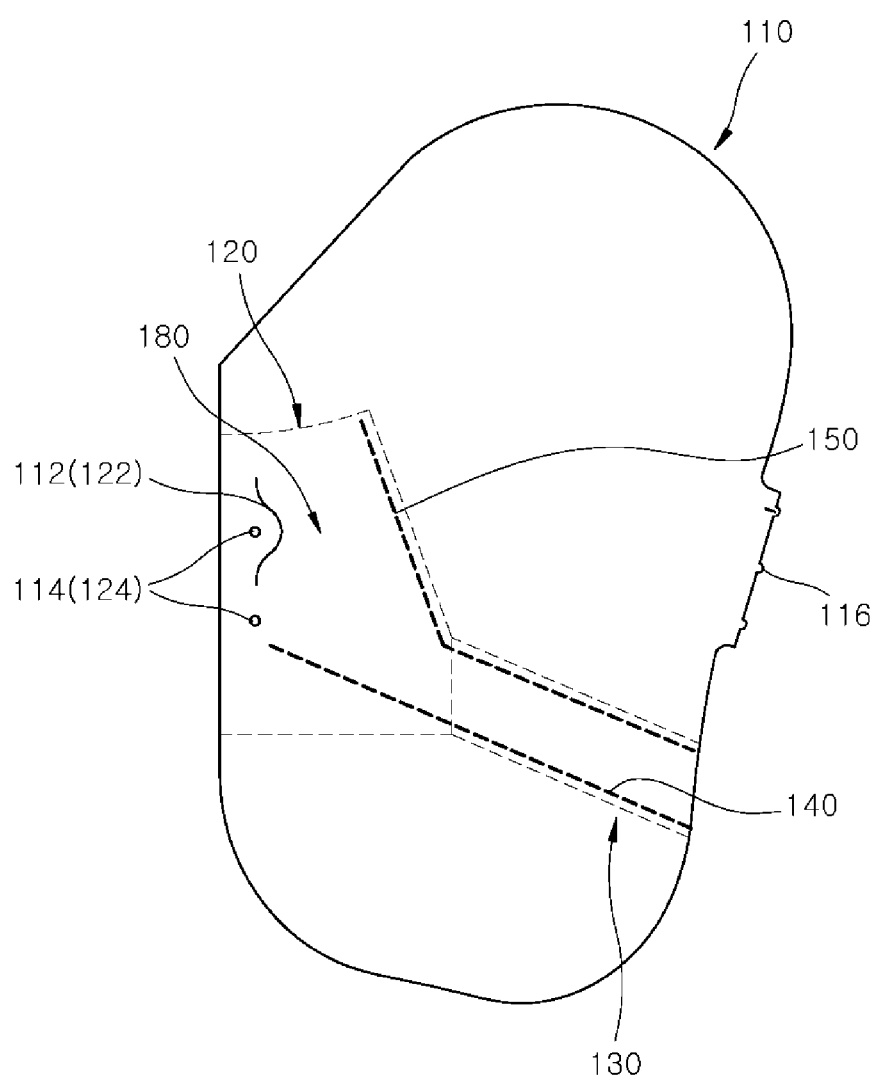
FIG. 5 is a top view illustrating the state in which the second sewing part is formed after the pocket sheet part and the partition sheet parts are superposed in the side airbag apparatus according to the embodiment of the present disclosure.
Figure 6:
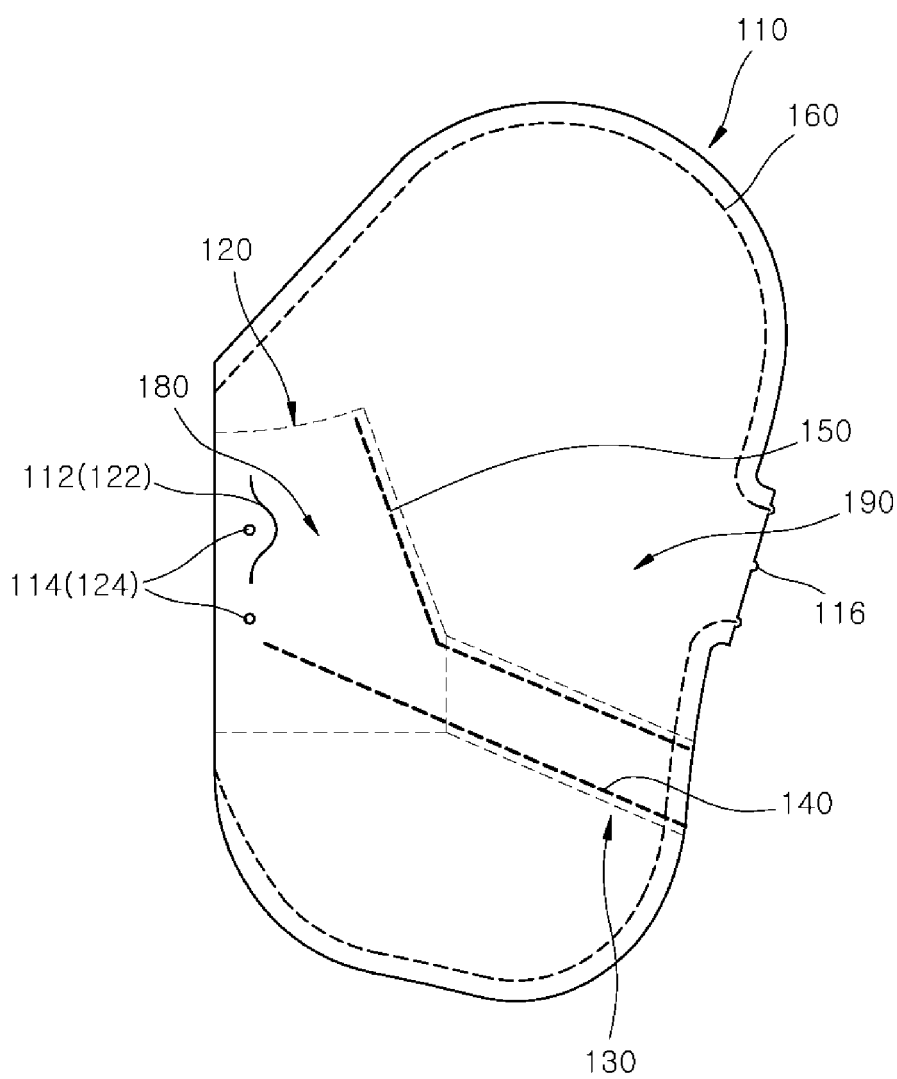
FIG. 6 is a top view illustrating a state in which a third sewing part is formed after the cushion sheet part is folded in the side airbag apparatus according to the embodiment of the present disclosure.
Figure 7:
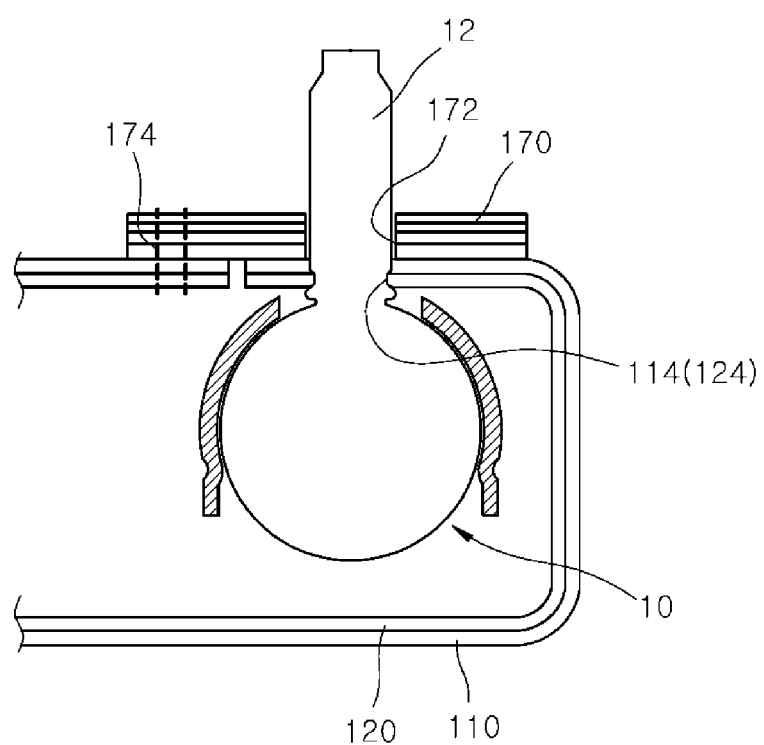
FIG. 7 is a sectional view illustrating a state in which an inflator is installed in the cushion sheet part and the pocket sheet part in the side airbag apparatus according to the embodiment of the present disclosure.
Figure 8:
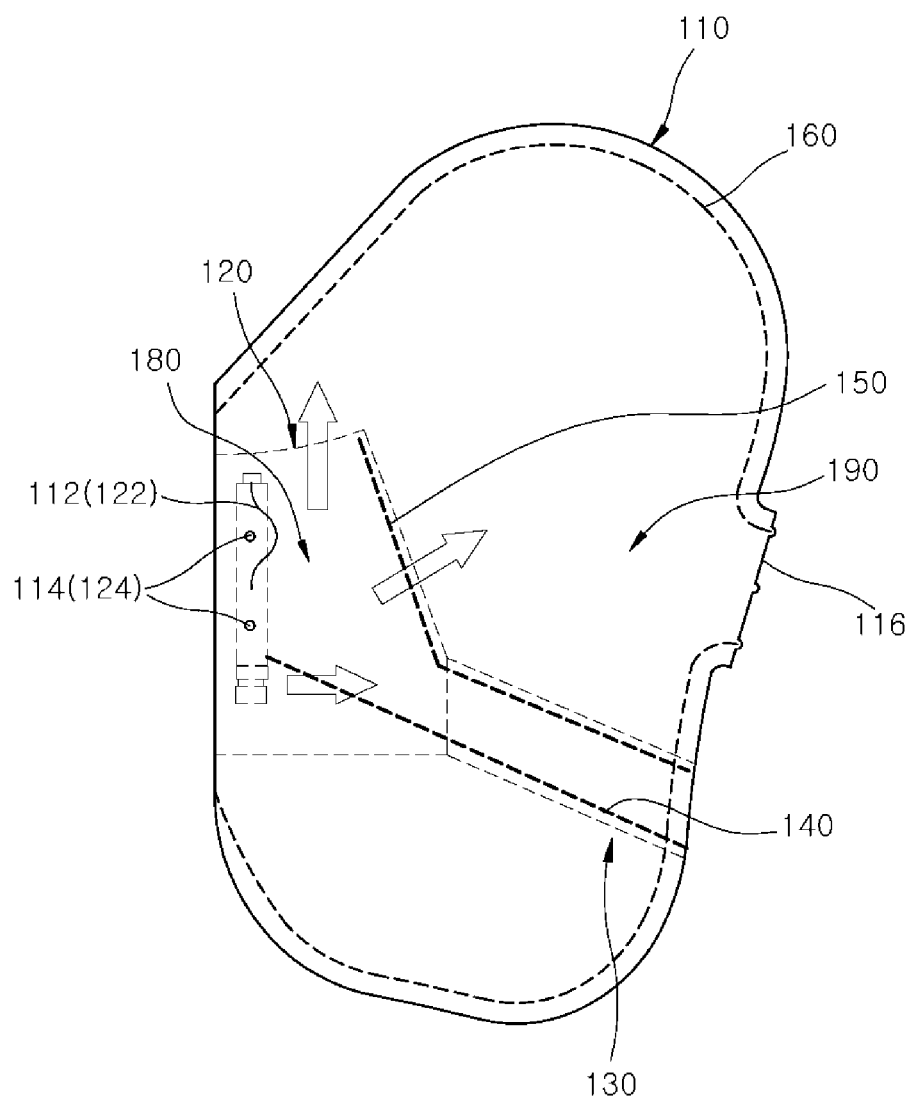
FIG. 8 is a top view illustrating a flow state of a gas in the side airbag apparatus according to the embodiment of the present disclosure.

FIG. 1 is an exploded view illustrating a side airbag apparatus according to an embodiment of the present disclosure. FIG. 2 is a top view illustrating a state in which first sewing parts are formed with a pocket sheet part and partition sheet parts superposed on a cushion sheet part in the side airbag apparatus according to the embodiment of the present disclosure. FIG. 3 is a perspective view illustrating a state in which the pocket sheet part and the partition sheet parts are superposed in the side airbag apparatus according to the embodiment of the present disclosure. FIG. 4 is a perspective view illustrating a state in which a second sewing part is formed after the pocket sheet part and the partition sheet parts are superposed in the side airbag apparatus according to the embodiment of the present disclosure. FIG. 5 is a top view illustrating the state in which the second sewing part is formed after the pocket sheet part and the partition sheet parts are superposed in the side airbag apparatus according to the embodiment of the present disclosure. FIG. 6 is a top view illustrating a state in which a third sewing part is formed after the cushion sheet part is folded in the side airbag apparatus according to the embodiment of the present disclosure. FIG. 7 is a sectional view illustrating a state in which an inflator is installed in the cushion sheet part and the pocket sheet part in the side airbag apparatus according to the embodiment of the present disclosure. FIG. 8 is a top view illustrating a flow state of a gas in the side airbag apparatus according to the embodiment of the present disclosure.

Referring to FIGS. 1 to 8, the side airbag apparatus 100 according to the embodiment of the present disclosure includes a cushion sheet part 110, a pocket sheet part 120, partition sheet parts 130, first sewing parts 140, a second sewing part 150, and a third sewing part 160.

The cushion sheet part 110 provides a first insertion slot part 112 and first stud hole parts 114. The cushion sheet part 110 may be formed of a fabric into which, for instance, synthetic fiber yarns and threads are woven. The cushion sheet part 110 may be formed of one or multiple fabrics.

The first insertion slot part 112 is formed in such a size that an inflator 10 can pass therethrough. The first insertion slot part 112 may be formed in a round shape. Each of the first stud hole parts 114 may be formed in a circular shape.

The pocket sheet part 120 has a second insertion slot part 122 and second stud hole parts 124 that are formed to correspond to the first insertion slot part 112 and the first stud hole parts 114, respectively, and is superposed on the cushion sheet part 110 as illustrated in FIG. 2. The pocket sheet part 120 may be formed of a fabric into which, for instance, synthetic fiber yarns and threads are woven. The pocket sheet part 120 may be formed of one or multiple fabrics. The pocket sheet part 120 may be formed of a material that is identical to or different from that of the cushion sheet part 110.

The second insertion slot part 122 is formed in such a size that the inflator 10 can pass therethrough. The second insertion slot part 122 may be formed in a round shape. Each of the second stud hole parts 124 may be formed in a circular shape.

Because the first insertion slot part 112 corresponds to the second insertion slot part 122, the inflator 10 may be inserted into a sub-chamber part 180 of the pocket sheet part 120 through the first insertion slot part 112 and the second insertion slot part 122. Further, because the first stud hole parts 114 correspond to the second stud hole parts 124, stud parts 12 (see FIG. 7) of the inflator 10 may be drawn outside the cushion sheet part 110 through the first stud hole parts 114 and the second stud hole parts 124. Therefore, the inflator 10 may be fixed to a fixing bracket (not illustrated) via the stud parts 12.

Further, if the inflator 10 is inserted into the pocket sheet part 120 through the first insertion slot part 112 and the second insertion slot part 122, a circumferential portion of the inflator 10 is blocked by the cushion sheet part 110. Thus, since the inflator 10 is not separated from the cushion sheet part 110, an additional sewing process can be omitted. Furthermore, the number of manufacturing processes and a manufacturing time of the side airbag apparatus can be reduced.

Further, because the single cushion sheet part 110 is folded and the inflator 10 is inserted into the first insertion slot part 112 and the second insertion slot part 122, a portion in which the inflator 10 is installed may not be sewn at the cushion sheet part 110 in order to prevent separation of the inflator 10 and leakage of a gas. Thus, the number of sewing processes is reduced, and an additional sewing portion is omitted, so that a size of the cushion sheet part 110 may be reduced.

The partition sheet parts 130 are superposed on the cushion sheet part 110 to be connected to both sides of the pocket sheet part 120. The partition sheet parts 130 may be formed of a fabric into which, for instance, synthetic fiber yarns and threads are woven. Each of the partition sheet parts 130 may be formed of one or multiple fabrics. Each of the partition sheet parts 130 may be formed of a material that is identical to or different from that of the cushion sheet part 110.

The first sewing parts 140 connect the partition sheet parts 130 and the pocket sheet part 120 to the cushion sheet part 110. Thus, the partition sheet parts 130 and the pocket sheet part 120 are stably fixed to the cushion sheet part 110.

The second sewing part 150 connects superposed ends of the pocket sheet part 120 and the partition sheet parts 130 in a state in which the pocket sheet part 120 and the partition sheet parts 130 are each folded in half. Thus, the sub-chamber part 180 surrounded by the pocket sheet part 120 and the partition sheet parts 130 is formed.

The cushion sheet part 110 is folded on the basis of a center portion C, and the third sewing part 160 connects superposed circumferential portions of the cushion sheet part 110. In this case, superposed outer ends of the cushion sheet part 110 and the folded circumferential portions of the cushion sheet part 110 are sealed by the third sewing part 160. Thus, an outer end of the sub-chamber part 180 and a circumferential portion of a main chamber part 190 are sealed.

Further, the sub-chamber part 180 is sealed by the pocket sheet part 120, the partition sheet parts 130, the first sewing parts 140, the second sewing part 150, and the third sewing part 160, and thus is partitioned independently of the main chamber part 190. Thus, in the event of deployment of the side airbag apparatus, an internal pressure of the sub-chamber part 180 may be generated to differ from that of the main chamber part 190.

The cushion sheet part 110 is formed such that both sides 110a and 110b thereof are symmetric with respect to the center portion C. The cushion sheet part 110 may be formed in such a manner that a vertical length of the center portion C becomes longer than vertical lengths of both the sides 110a and 110b. Thus, if the cushion sheet part 110 is folded on the basis of the center portion C, both the sides 110a and 110b of the cushion sheet part 110 can be exactly superposed on each other.

The pocket sheet part 120 is formed such that both sides thereof are symmetric with respect to the center portion C of the cushion sheet part 110. The pocket sheet part 120 may be formed in an isosceles trapezoidal shape in which both sides thereof are narrowed toward one side thereof.

The partition sheet parts 130 are disposed on both the sides of the cushion sheet part 110 to be symmetric with respect to the center portion C of the cushion sheet part 110. The partition sheet parts 130 may be each formed in a band shape that is narrow and long, and opposite ends of the partition sheet parts 130 may be slantly formed. Since the partition sheet parts 130 are symmetrically disposed on both the sides 110a and 110b of the cushion sheet part 110, the two partition sheet parts 130 may be exactly superposed on each other as the pocket sheet part 120 is folded on the basis of the center portion C. Thus, first sides of the partition sheet parts 130 are connected to the cushion sheet part 110 by the first sewing parts 140, and other sides of the partition sheet parts 130 are connected and sealed by the second sewing part 150. The partition sheet parts 130 may be sewn to the cushion sheet part 110 to abut the partition sheet part 120 on two sides of the partition sheet part 120.

The third sewing part 160 is sewn to a portion of the cushion seat part 110, except a part of the circumferential portion of the cushion sheet part 110, to form a vent hole part 116 in the circumferential portion of the cushion sheet part 110. The third sewing part 160 seals the circumferential portion of the cushion sheet part 110 except the vent hole part 116 and the center portion C of the cushion sheet part 110. In this case, after the cushion sheet part 110 is inflated, some of the gas of the main chamber part 190 is discharged to the outside through the vent hole part 116. The vent hole part 116 is not formed in the sub-chamber part 180. For this reason, the internal pressure of the main chamber part 190 becomes lower than that of the sub-chamber part 180. Thus, after absorbing an impact of an occupant in the event of a collision of a vehicle, the main chamber part 190 may be prevented from continuously pressing the occupant, thereby reducing a possibility of injuring the occupant.

The stud parts 12 of the inflator 10 pass through the first stud hole parts 114 and the second stud hole parts 124. The side airbag apparatus further includes a sealing cover part 170 into which the stud parts 12 are inserted to seal the first stud hole parts 114, and a sealing sewing part 174 that connects the sealing cover part 170 to the cushion sheet part 110. Third stud hole parts 172 are formed in the sealing cover part 170 such that the stud parts 12 are inserted thereinto. Since the sealing cover part 170 is fitted onto the stud parts 12, a gas can be prevented from leaking through the first stud hole parts 114 and the second stud hole parts 124. Further, since the sealing sewing part 174 connects the sealing cover part 170 to the cushion sheet part 110, the sealing cover part 170 can be prevented from being separated from the cushion sheet part 110 by an expansion pressure of the gas.

A manufacturing method of the side airbag apparatus, configured as described above, according to the embodiment of the present disclosure will be described.

Figure 9:
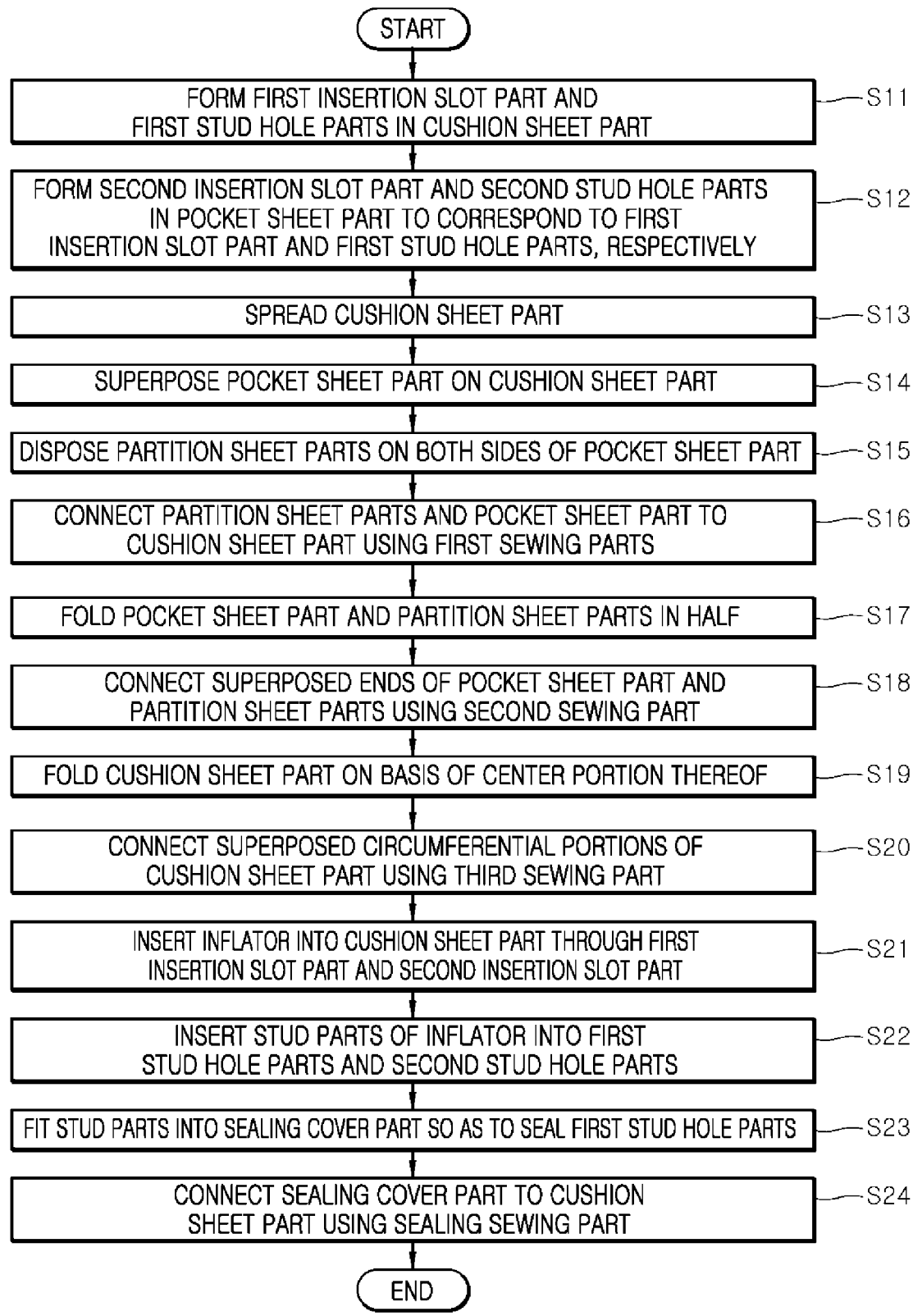
FIG. 9 is a flow chart illustrating a manufacturing method of a side airbag apparatus according to an embodiment of the present disclosure.

FIG. 9 is a flow chart illustrating a manufacturing method of the side airbag apparatus according to an embodiment of the present disclosure.

Referring to FIG. 9, the first insertion slot part 112 and the first stud hole parts 114 are formed in the cushion sheet part 110 (S11). In this case, the first insertion slot part 112 is formed in such a size that the cylindrical inflator 10 can pass therethrough. The first insertion is slot part 112 may be formed in a round shape. Each of the first stud hole parts 114 may be formed in a circular shape.

The second insertion slot part 122 and the second stud hole parts 124 are formed in the pocket sheet part 120 to correspond to the first insertion slot part 112 and the first stud hole parts 114, respectively (S12). In this case, the second insertion slot part 122 is formed in such a size that the inflator 10 can pass therethrough. The second insertion slot part 122 may be formed in a round shape. Each of the second stud hole parts 124 may be formed in a circular shape.

The first stud hole parts 114 and the second stud hole parts 124 are formed at one side of the cushion sheet part 110 on the basis of the center portion C of the cushion sheet part 110. Thus, the stud parts 12 of the inflator 10 pass through the first stud hole parts 114 and the second stud hole parts 124, and thereby protrude to one side of the cushion sheet part 110.

The cushion sheet part 110 is flatly spread on a floor (S13). In this case, the cushion sheet part 110 is formed such that both sides thereof are symmetric with respect to the center portion C thereof. In this case, the cushion sheet part 110 may be formed in such a manner that a vertical length of the center portion C becomes longer than vertical lengths of both the sides 110a and 110b.

The pocket sheet part 120 is superposed on the cushion sheet part 110 (S14). Both sides of the pocket sheet part 120 are symmetric with respect to the center portion C of the cushion sheet part 110. In this case, the pocket sheet part 120 may be formed in an isosceles trapezoidal shape in which both the sides thereof are narrowed toward one side thereof.

The partition sheet parts 130 are disposed on both the sides of the pocket sheet part 120 (S15). The partition sheet parts 130 are disposed on both the sides 110a and 110b of the cushion sheet part 110 to be symmetric with respect to the center portion C of the cushion sheet part 110. The partition sheet parts 130 are each formed in a band shape that is narrow and long, and opposite ends of the partition sheet parts 130 may be slantly formed.

The pocket sheet part 120 and the partition sheet parts 130 are connected to the cushion sheet part 110 by the first sewing parts 140 (S16). Thus, the partition sheet parts 130 and the pocket sheet part 120 are stably fixed to the cushion sheet part 110. The pocket sheet part 120 and partition sheet parts 130 may have corresponding edge portions to abut each other.

The pocket sheet part 120 and the partition sheet parts 130 are folded in half (S17). In this case, the pocket sheet part 120 and the partition sheet parts 130 are superposed on the basis of the center portion C in a widthwise direction.

Superposed ends of the pocket sheet part 120 and ends of the partition sheet parts 130 are connected by the second sewing part 150 (S18). Thus, the sub-chamber part 180 surrounded by the pocket sheet part 120 and the partition sheet parts 130 is formed.

The cushion sheet part 110 is folded on the basis of the center portion C of the cushion sheet part 110 (S19). In this case, upper and lower sides of the cushion sheet part 110 are formed in a round shape.

Superposed circumferential portions of the cushion sheet part 110 are connected by the third sewing part 160 (S20). In this case, superposed outer ends of the cushion sheet part 110 and the superposed circumferential portions of the cushion sheet part 110 are sealed by the third sewing part 160. Thus, an outer end of the sub-chamber part 180 and a circumferential portion of the main chamber part 190 are each sealed.

In this case, the third sewing part 160 is sewn to a portion of the cushion seat part 110, except a part of the circumferential portion of the cushion sheet part 110, to form the vent hole part 116 in the circumferential portion of the cushion sheet part 110. The third sewing part 160 seals the circumferential portion of the cushion sheet part 110 except the vent hole part 116 and the center portion C of the cushion sheet part 110. In this case, if the cushion sheet part 110 is inflated, some of the gas of the main chamber part 190 is discharged to the outside through the vent hole part 116, and the vent hole part 116 is not formed in the sub-chamber part 180. For this reason, an internal pressure of the main chamber part 190 becomes lower than that of the sub-chamber part 180. Thus, after absorbing an impact of an occupant in the event of a collision of a vehicle, the main chamber part 190 can be prevented from continuously pressing the occupant, thereby reducing a possibility of injuring the occupant.

The inflator 10 is inserted into the cushion sheet part 110 through the first insertion slot part 112 and the second insertion slot part 122 (S21). In this case, because the center portion C of the cushion sheet part 110 is a boundary along which the cushion sheet part 110 is folded, the center portion C of the cushion sheet part 110 maintains a sealed state. Thus, after the inflator 10 is inserted into the cushion sheet part 110, the outer side of the cushion sheet part 110 need not be sewn. Thus, as a separate sewing process is omitted, the number of manufacturing processes and a manufacturing time of the side airbag apparatus can be reduced.

Further, because the single cushion sheet part 110 is folded and the inflator 10 is inserted into the first insertion slot part 112 and the second insertion slot part 122, a portion in which the inflator 10 is installed may not be sewn at the cushion sheet part 110 in order to prevent separation of the inflator 10 and leakage of a gas. Thus, the number of sewing processes is reduced, and an additional sewing portion is omitted, so that a size of the cushion sheet part 110 may be reduced.

The stud parts 12 of the inflator 10 are inserted into the first stud hole parts 114 and the second stud hole parts 124 (S22). In this case, the stud parts 12 of the inflator 10 protrude to one side of the cushion sheet part 110.

The stud parts 12 are fitted into the sealing cover part 170 to seal the first stud hole parts 114 (S23). In this case, the third stud hole parts 172 are formed in the sealing cover part 170 such that the stud parts 12 are fitted thereinto.

The sealing cover part 170 is connected to the cushion sheet part 110 by the sealing sewing part 174 (S24). Because the sealing cover part 170 is fitted onto the stud parts 12, a gas can be prevented from leaking through the first stud hole parts 114 and the second stud hole parts 124. Further, because the sealing sewing part 174 connects the sealing cover part 170 to the cushion sheet part 110, the sealing cover part 170 can be prevented from being separated from the cushion sheet part 110 due to an expansion pressure of the gas.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A side airbag apparatus comprising:
   a cushion sheet part including a first insertion slot part and first stud hole parts;
   a pocket sheet part in which a second insertion slot part and second stud hole parts correspond to the first insertion slot part and the first stud hole parts, respectively, and which is superposed on the cushion sheet part;
   partition sheet parts superposed on the cushion sheet part so as to be connected to both sides of the pocket sheet part;
   first sewing parts configured to connect the partition sheet parts and the pocket sheet part to the cushion sheet part;
   a second sewing part configured to connect superposed ends of the pocket sheet part and superposed ends of the partition sheet parts in a state in which the pocket sheet part is folded in half; and
   a third sewing part configured to connect superposed circumferential portions of the cushion sheet part in a state in which the cushion sheet part is folded on the basis of a center portion thereof.

2. The side airbag apparatus according to claim 1, wherein both sides of the cushion sheet part are symmetric with respect to the center portion thereof.

3. The side airbag apparatus according to claim 2, wherein both sides of the pocket sheet part are symmetric with respect to the center portion of the cushion sheet part.

4. The side airbag apparatus according to claim 3, wherein the partition sheet parts are disposed on both the sides of the cushion sheet part to be symmetric with respect to the center portion of the cushion sheet part.

5. The side airbag apparatus according to claim 1, wherein the first stud hole parts and the second stud hole parts are disposed on one side of the cushion sheet part on the basis of the center portion of the cushion sheet part.

6. The side airbag apparatus according to claim 5, wherein the third sewing part is sewn to a portion of the cushion sheet part, except a part of a circumferential portion of the cushion sheet part including a vent hole part in the circumferential portion of the cushion sheet part.

7. The side airbag apparatus according to claim 6, further comprising a sub-chamber part surrounded by the pocket sheet part and the partition sheet parts and a main chamber part wherein the vent hole is configured to discharge gas from the main chamber part.

8. The side airbag apparatus according to claim 1, wherein:
   stud parts of an inflator pass through the first stud hole parts and the second stud hole parts; and
   the side airbag apparatus further comprises a sealing cover part into which the stud parts are fitted to seal the first stud hole parts, and a sealing sewing part configured to connect the sealing cover part to the cushion sheet part.

9. The side airbag apparatus according to claim 1, wherein a portion of the partition sheet parts abuts a portion of the pocket sheet part.

10. The side airbag apparatus according to claim 1, wherein the first insertion slot has a round shape.

11. A manufacturing method of a side airbag apparatus, comprising:
    forming a first insertion slot part and first stud hole parts in a cushion sheet part, and forming a second insertion slot part and second stud hole parts in a pocket sheet part to correspond to the first insertion slot part and the first stud hole parts, respectively;
    superposing the pocket sheet part on the cushion sheet part;
    disposing partition sheet parts on both sides of the pocket sheet part;
    connecting the pocket sheet part and the partition sheet parts to the cushion sheet part using first sewing parts;
    superposing ends of the pocket sheet part and superposing ends of the partition sheet parts, and connecting the superposed ends of the pocket sheet part and the superposed ends of the partition sheet parts using a second sewing part; and
    folding the cushion sheet part on the basis of a center portion thereof, and connecting superposed circumferential portions of the cushion sheet part using a third sewing part.

12. The manufacturing method according to claim 11, wherein the cushion sheet part is formed such that both sides thereof are symmetric with respect to the center portion thereof.

13. The manufacturing method according to claim 12, wherein the pocket sheet part is formed such that both sides thereof are symmetric with respect to the center portion of the cushion sheet part.

14. The manufacturing method according to claim 13, wherein the partition sheet parts are disposed on both the sides of the cushion sheet part to be symmetric with respect to the center portion of the cushion sheet part.

15. The manufacturing method according to claim 11, wherein the first stud hole parts and the second stud hole parts are formed on one side on the basis of the center portion of the cushion sheet part.

16. The manufacturing method according to claim 11, wherein the third sewing part is sewn to a portion of the cushion sheet part, except a part of a circumferential portion of the cushion sheet part, so as to form a vent hole part in the circumferential portion of the cushion sheet part.

17. The manufacturing method according to claim 11, further comprising:
   inserting an inflator into the cushion sheet part through the first insertion slot part and the second insertion slot part; and
   inserting stud parts of the inflator into the first stud hole parts and the second stud hole parts.

18. The manufacturing method according to claim 17, further comprising:
   fitting the stud parts into a sealing cover part so as to seal the first stud hole parts; and
   connecting the sealing cover part to the cushion sheet part using a sealing sewing part.

19. The manufacturing method according to claim 11, further comprising sewing portions of the partition sheet parts to abut portions of the pocket sheet part.

20. The side airbag apparatus according to claim 11, further comprising forming the first insertion slot into a round shape.

* * * * *